United States Patent [19]

Vachon

[11] Patent Number: 4,477,989
[45] Date of Patent: Oct. 23, 1984

[54] SNOWBLOWER AND SCARIFYING AUGER ASSEMBLY THEREFOR

[76] Inventor: René Vachon, 318A St. Raphaël St., Valleyfield, Canada, J6T 3A6

[21] Appl. No.: 503,862

[22] Filed: Jun. 13, 1983

[30] Foreign Application Priority Data

Mar. 4, 1983 [CA] Canada .................................... 422938

[51] Int. Cl.³ .............................................. E01H 5/09
[52] U.S. Cl. ............................................ 37/252; 403/2
[58] Field of Search ................ 37/248, 249, 250, 251, 37/252, 254, 219-224; 403/2

[56] References Cited

U.S. PATENT DOCUMENTS

| | | | |
|---|---|---|---|
| 1,906,718 | 5/1933 | Ritchie | 37/252 |
| 2,200,623 | 5/1940 | James | 37/252 |
| 2,482,213 | 9/1949 | Ritchie | 37/249 |
| 3,078,603 | 2/1963 | Ertsgaard et al. | 37/252 |
| 3,349,506 | 10/1967 | Rubin | 37/248 |
| 3,395,466 | 8/1968 | Klapprodt | 37/252 |
| 3,464,128 | 9/1969 | Krickovich | 37/252 X |

FOREIGN PATENT DOCUMENTS

| | | | |
|---|---|---|---|
| 627518 | 9/1961 | Canada | 37/252 |
| 1069546 | 1/1980 | Canada | 37/249 |
| 751892 | 7/1980 | U.S.S.R. | 37/252 |

*Primary Examiner*—Edgar S. Burr
*Assistant Examiner*—Moshe I. Cohen

[57] ABSTRACT

A snowblower and a scarifying auger assembly for it which are characterized by a helicoid auger provided with scarifying teeth serially secured along its outer helical edge and each pivotally restrained by a shear bolt to scarify and easily plow and blow away the packed snow and for pivotal retraction of any tooth upon impact with an obstacle. The helicoid auger is thus relatively of essentially smaller diameter and protected by the scarifying teeth against impact of obstacles against it and against the ensuing expensive repair. Snow-throwing scoops are also arranged to be attached in different numbers and positions around the rotation axis of the helicoid auger.

1 Claim, 12 Drawing Figures

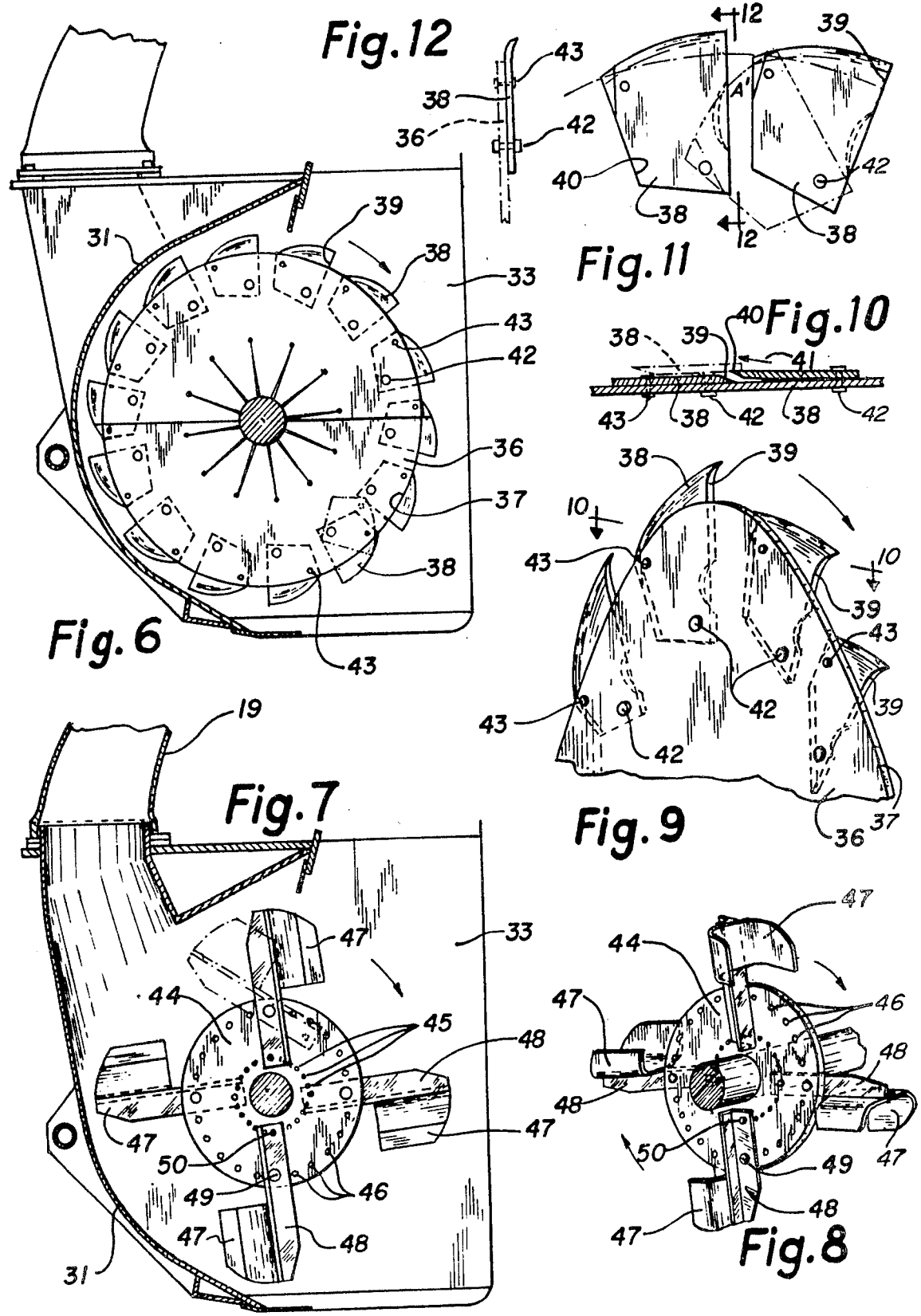

SNOWBLOWER AND SCARIFYING AUGER ASSEMBLY THEREFOR

FIELD OF THE INVENTION

This invention relates to snowblowers and to a snowblower auger assembly in particular of the type embodying a helicoid auger.

DESCRIPTION OF THE PRIOR ART

The snowblower of the above type is conventionally made such that the outer helical edge of the helicoid auger is of uniform outline to merely plow the snow by lateral scraping action. That helical edge is essentially blunt and of some thickness and it thus bears on packed snow without substantially cutting into it. Such snowblower auger assembly is thus unable to satisfactorily remove the packed snow. When it does, it is at the substantial expense of power to axially scrape loose the packed snow. Another noteworthy disadvantage of the heretofore used helicoid auger is that they themselves engage the ground and are expensively damaged upon their impact with unseen obstacles.

SUMMARY OF THE INVENTION

It is a general object of the present invention to provide a snowblower and a snowblower auger assembly of the above type, which substantially avoids the above-mentioned disadvantages.

It is another object of the present invention to provide a snowblower and snowblower auger assembly of the above type, which is particularly adapted to scarify and satisfactorily remove the packed snow.

It is a further object of the present invention to provide a snowblower and snowblower auger assembly of the above type, wherein the helicoid auger is of relatively smaller diametrical size and ends short of engagement with the ground and with most of the unseen obstacles to minimize expensive maintenance and repair of the helicoid auger.

It is still further object of the present invention to provide a snowblower and snowblower auger assembly of the above type, wherein the packed snow is loosened up and scraped more efficiently, using comparatively less power than when provided with an above-mentioned helicoid auger.

It is a more specific object of the present invention to provide a snowblower and snowblower auger assembly of the above type, which are provided with scarifying teeth along the helical edge of the helicoid auger to efficiently scarify and remove the packed snow and to yield against damage upon impact with obstacles.

It is another more specific object of the present invention to provide a snowblower and snowblower auger assembly of the above type, which are provided with snow-throwing scoops that are also yieldable against damage upon impact with obstacles and that may be attached in different numbers and positions around their supporting shaft.

BRIEF DESCRIPTION OF THE DRAWINGS

The above and other objects and advantages of the present invention will be better understood with reference to the following detailed description of preferred embodiments thereof which are illustrated, by way of example, in the accompanying drawings, in which:

FIG. 6 is a cross-sectional view as seen along line 6—6 in FIG. 2;

FIG. 7 is a cross-sectional view as seen along line 7—7 in FIG. 2;

FIG. 8 is a perspective view of a set of snow-throwing scoops and their carrier disk forming part of the illustrated scarifying snowblower auger assembly;

FIG. 9 is a perspective view of a portion of the helicoid auger with the associated scarifying teeth forming part of the illustrated scarifying snowblower auger assembly;

FIG. 10 is a cross-sectional view as seen along line 10—10 in FIG. 9;

FIG. 11 is a side elevation view of a pair of successive scarifying teeth in relative position of operation with respect to the helicoid auger; and FIG. 12 is a cross-sectional view as seen along line 12—12 in FIG. 11.

DESCRIPTION OF PREFERRED EMBODIMENTS

Figure 1:
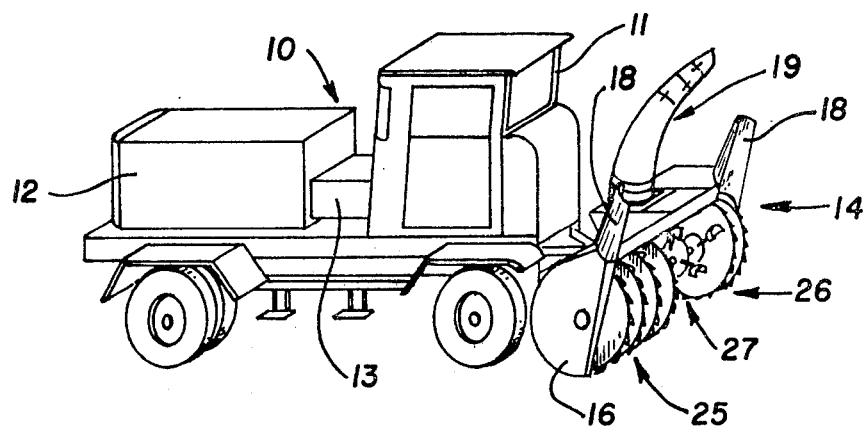
FIG. 1 is a perspective view of a snowblower operatively attached at the front of a truck.

The illustrated snowblower and snowblower auger assembly are of the type adapted to be attached and operated by a truck, such as the truck 10. However, the same snowblower and auger assembly may be embodied in the wheel-mounted and powered type, such as used by individuals to clear their driveway.

The truck 10 includes a relatively high cab 11 for unobstructed view, a housing 12 for a diesel engine driving, and a hydraulic pump located in housing 13 located right behind the cab 11 and of appropriate and known type to produce the needed hydraulic power to actuate the snowblower 14. The latter may be attached to the truck 10 in any known manner.

The snowblower 14 includes a trough-shape casing longitudinally extending transversely of the truck and, thus, of the direction of displacement. The trough-shape casing includes a curved main portion 15 and opposite ends 16 and 17 cooperatively forming a front mouth extending substantially the full width and height of the snowblower. A wing or blade 18 projects upward and forward at each end of the snowblower 14 and is rearwardly curved inward to assist cutting through high snow drifts and snow banks. An articulated and conventional snow-ejection tube assembly 19 is rotatively mounted on the upper portion of the trough-shape casing portion 15. The construction and operation of the ejection tube assembly 19 do not form part of the present invention and need not be defined in detail.

The snowblower 14 includes a shaft 20 having its opposite ends rotatively mounted in the opposite ends 16, 17 respectively. The shaft 20 thus defines an axis of rotation extending in the above-mentioned transverse direction relative to the operative direction of displacement of the snowblower. The shaft 20 is driven by a hydraulic motor 21 through a chain 22 and sprocket wheels 23 and 24. The snowblower 14 includes a scarifying auger assembly comprising a longer first helicoid auger section 25, a shorter second helicoid auger section 26, and an intermediate snow-throwing section 27 mounted on a common tubular hub 28. The latter is connected to the shaft 20 as by welding.

Figure 2:
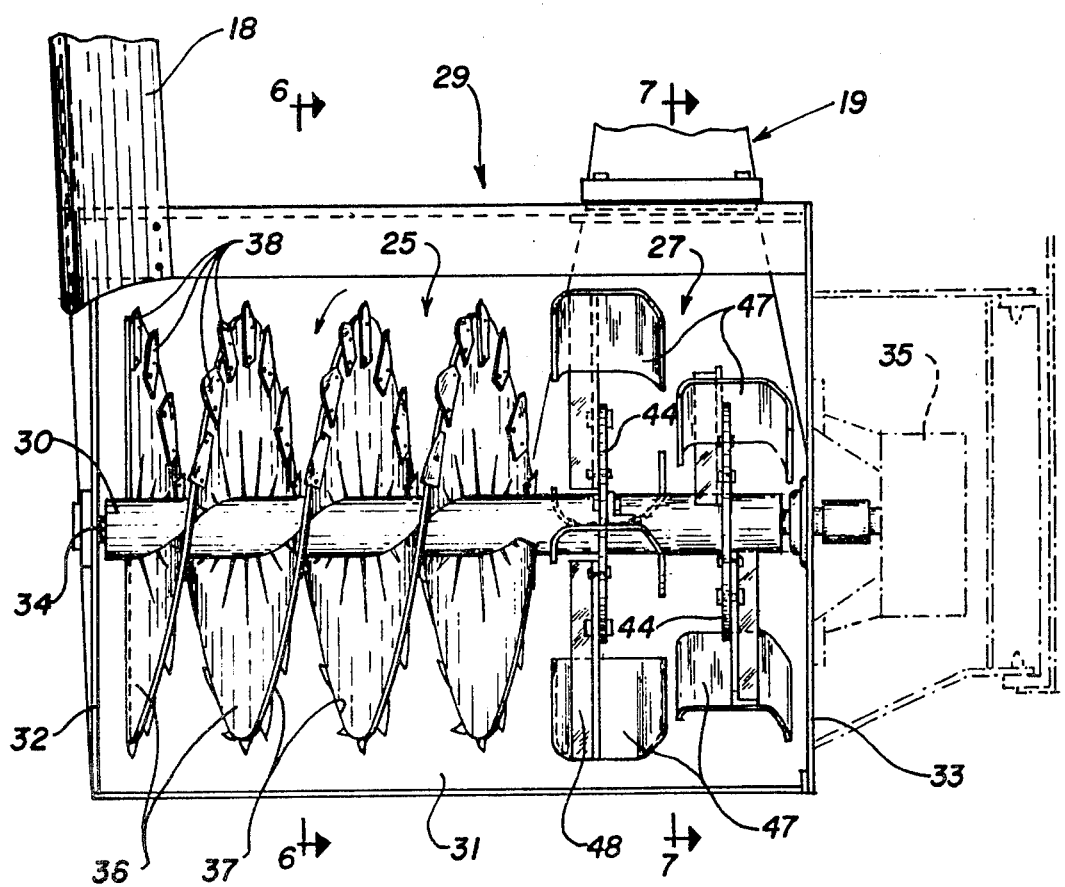
FIG. 2 is an elevation view of a snowblower according to another embodiment of the present invention as compared to the snowblower of FIG. 1.
Figure 3:
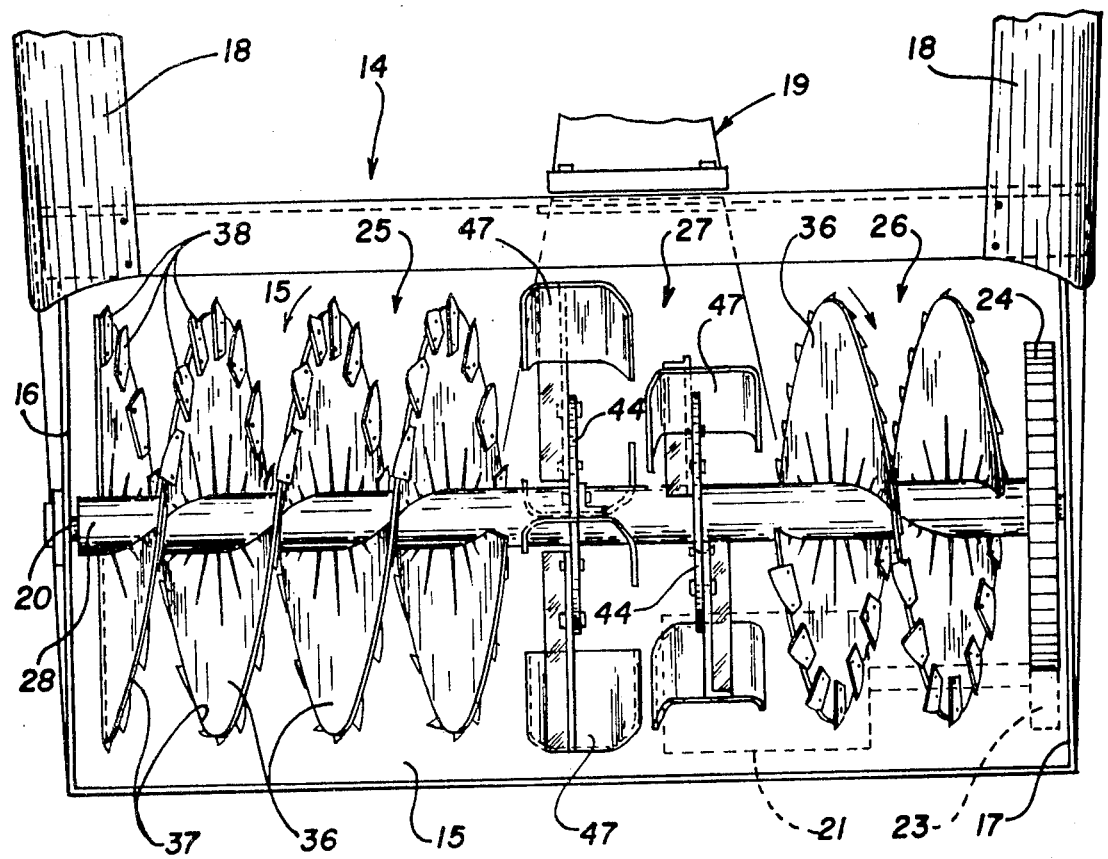
FIG. 3 is a front elevation view of the snowblower of FIG. 1.
Figure 4:
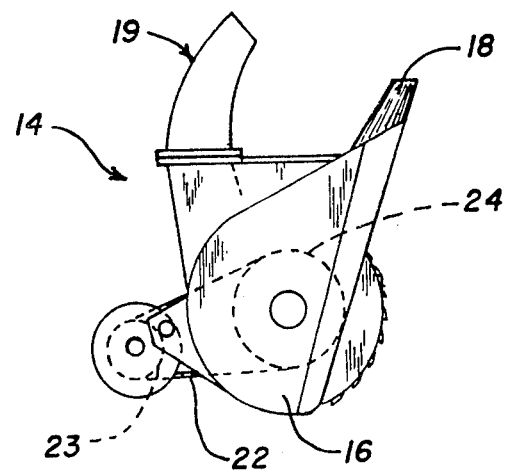
FIG. 4 is a side elevation view of a snowblower according to the present invention.
Figure 5:
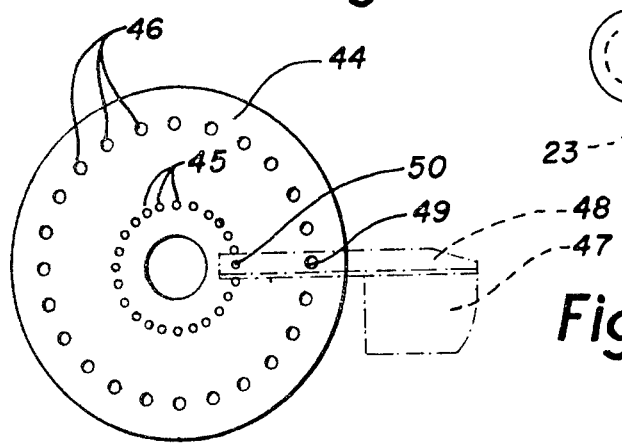
FIG. 5 is an axial view of a disk forming part of a snowblower according to the present invention.

FIGS. 2, 6, and 7 illustrate another embodiment of a snowblower according to the present invention. This snowblower 29 includes a scarifying auger assembly mainly characterized by having only one helicoid auger section, a section 25, adjacent a snow-throwing section 27. The snowblower 29 includes a tubular hub 30 carrying the corresponding auger section 25 and snow-throwing section 27. Each of the helicoid auger section 25 and 26 is spiraled around its corresponding tubular hub 28 or 30 in appropriate direction to axially scrape the snow toward the associated snow-throwing section 27.

The snowblower 29 comprises a trough-shape casing including a curved main portion 31 and opposite ends 32, 33 cooperatively defining a front mouth substantially co-extensive with the width and height of the snowblower. Only one wing or blade 18 is provided, as above mentioned, over the end 32. A shaft 34 is rotatively mounted at its opposite ends in the opposite ends 32, 33 of the trough-shape casing. The shaft 34 outwardly projects from the end 33 to be driven there in any appropriate manner that does not form part of the present invention and is only schematically shown in dotted line. For instance, an appropriate hydraulic motor 35 may drive the shaft 34. Each of the hydraulic motors 21 and 35 may be connected to the hydraulic pump system in housing 13 to be energized through it.

The tubular hub 30 is secured on the shaft 34 for bodily rotation therewith. An articulated snow-ejection tube assembly 19 is rotatively mounted on the casing 31, 32, 33 in the same conventional manner as for the snowblower 14, directly over the corresponding snow-throwing section 27.

Each of the helicoid auger section 25, 26 includes a helicoid blade 36 having a helical edge 37 defining a cylindrical outline. A series of scarifying teeth 38 are secured to each helicoid auger 36 and project radially outward from its helical edge 37. The teeth 38 are of generally quadrilateral shape defining a cutting leading edge 39 and a trailing edge 40, as best seen in FIG. 11.

As may best be seen in FIG. 10, the leading edge 39 is sharpened from one face only and the trailing edge is complementarily tapering, such that the retraction of any tooth against the following tooth, as shown by the arrow 41, results in a lateral wedging action on the retracting tooth that is thus caused to slide along the following tooth, as shown in dotted lines. Each scarifying tooth 38 has its outer edge portion curved in the axial direction toward the corresponding snow-throwing section 27 and each tooth 38 is fixed on the side of the auger facing the snow-throwing section 27. The curved outer edge portion facilitates feeding snow towards the section 27.

Each scarifying tooth 38 is pivotally connected to the corresponding helicoid blade 36 by a bolt 42 and is restrained at its diagonally-opposite corner by a shear bolt 43. Thus, upon impact of any tooth 38 with an unseen obstacle on the ground, the corresponding shear bolt 43 can shear to allow the above-mentioned retractive pivoting of the tooth and, thus, prevent its breaking. The helicoid auger 36 is thus protected against damage by those teeth absorbing the impact with the obstacles, and by being elevated relative to the ground for passage of the teeth.

The snow-throwing section 27 includes a pair of carrier discs 44 fixedly secured on the corresponding tubular hub 28 or 30. Each disc 44 is provided with an inner and smaller circle of holes 45 and an outer and larger circle of holes 46. A selected number of snow-throwing scoops 47 are attached to each disc 44 by means of arms 48. Each arm 48 has an outer end fixedly secured to the corresponding scoop 47 and has its inner end pivotally secured by a bolt 49 in a selected hole 46 and by a shear bolt 50 in a selected hole 45. The holes 45 and 46 allow to attach any small number of scoops 47 around each disc 44. The scoops of one disc are preferably positioned angularly midway relative to the scoops of the other disc.

Referring to FIG. 6, it will be noted that casing 31 has a minimum clearance with the tips of teeth 38 and scoops 47 at the bottom snow entrance portion of the casing, and that this clearance increases progressively towards the top of the casing. Therefore, friction exerted by the snow and foreign material on the casing is considerably decreased.

What I claim is:

1. A scarifying snowblower blade assembly comprising a helicoid auger having an axis defining an operatively horizontal rotation axis and having an outer helical edge portion, said auger, upon rotation in one direction, moving the material engaged thereby in an axial direction along said axis towards one end of said auger, and scarifying teeth fixed to said helical edge portion serially along the latter, each tooth having a substantially flat radially inner portion which is secured flat against said helical edge portion and a radially outer edge portion which outwardly projects from said helical edge portion and which is laterally curved relative to said inner portion towards said axial direction, said teeth being closely arranged relative to each other along said helical edge portion, pivot means pivotally connecting each of the scarifying teeth to said helical edge portion, and a shearable element holding each scarifying tooth in operative position and located radially outwardly of said pivot means, said shearable element shearable upon impact of the corresponding tooth with an obstacle with the latter retractively pivoting relative to said helical edge portion to a retracted position laterally overlapping the next trailing tooth, each of said teeth including a leading edge and a trailing edge relative to said one direction of rotation, said leading edge and said trailing edge being wedged shape transversely of the tooth and in complementary direction relative one to the other to thereby permit said lateral overlapping movement of said tooth over the next trailing tooth.

* * * * *